United States Patent Office 3,374,058
Patented Mar. 19, 1968

3,374,058
PROCESS FOR PREPARING A CRYSTALLINE ZEOLITE
Carl V. McDaniel, Laurel, and Philip K. Maher and William E. Waxter, Baltimore, Md., assignors to W. R. Grace & Co., New York, N.Y., a corporation of Connecticut
No Drawing. Filed Dec. 8, 1964, Ser. No. 416,897
3 Claims. (Cl. 23—113)

ABSTRACT OF THE DISCLOSURE

A process of preparing a synthetic crystalline zeolite having the following mole ratio composition:

(0.1 to $0.4K_2O$:0.9 to $0.6Na_2O$):$Al_2O_3$:3–6$SiO_2$:0–9$H_2O$ which is characterized by utilizing specific mole ratio quantities of the reactants and further characterized in one embodiment by first aging a mixture containing $Na_2O$, $SiO_2$, $Al_2O_3$ and $H_2O$ before adding the $K_2O$ component.

---

This invention relates to new micro-selective zeolites and to methods for preparing these zeolites.

In summary, the new crystalline zeolite of this invention has a composition expressed in terms of oxides as follows:

$$(XK_2O:YNa_2O):Al_2O_3:3-6SiO_2:0-9H_2O$$

wherein X is within the range of from 0.1 to 0.4 and Y is within the range of from 0.9 to 0.6, the atoms of said zeolite being arranged in a unit cell in such a manner that the X-ray powder diffraction pattern of the material is essentially the same as that shown in Table A.

In summary, the process of this invention is a method for preparing a synthetic zeolite having a composition, expressed in terms of mole ratios of oxides, as follows:

$$(XK_2O:YNa_2O):Al_2O_3:3-6SiO_2:0-9H_2O$$

wherein X is within the range of from 0.1 to 0.4 and Y is within the range of 0.9 to 0.6, the atoms of said zeolite being arranged in a unit cell in such a manner that the X-ray powder diffraction pattern of the material is essentially the same as that shown in Table A, which process comprises preparing an aqueous silica-alumina-potassium oxide-sodium oxide reaction mixture having a composition, expressed in terms of mole ratios of oxides, which falls within the following ranges:

| | |
|---|---|
| $K_2O/Al_2O_3$ | 0.1–0.4 |
| $Na_2O/Al_2O_3$ | 2–4 |
| $SiO_2/Al_2O_3$ | 7–14 |
| $H_2O/Al_2O_3$ | 100–200 | wherein the silica reactant is a fine-sized silica, which has preferably been calcined at a temperature of from 200 to 1200° C., aging the mixture at a temperature of from about 20 to 60° C. for at least 2 hours, heating the mixture at a temperature of 90 to 120° C. until the crystalline zeolite product is formed, and separating the resulting crystalline zeolite from the mother liquor.

An alternative method for making the zeolite comprises forming an aqueous silica-alumina-sodium oxide reaction mixture having a composition, expressed in terms of mole ratios of oxides which falls within the following ranges:

| | |
|---|---|
| $Na_2O/Al_2O_3$ | 2–4 |
| $SiO_2/Al_2O_3$ | 7–14 |
| $H_2O/Al_2O_3$ | 100–200 | wherein the silica reactant is a fine-sized silica which has preferably been calcined at a temperature of from 200 to 1200° C., aging the mixture at a temperature of from about 20 to 60° C. for at least 2 hours, adding a quantity of potassium hydroxide and water to the aged reaction mixture sufficient to provide the following mole ratios of additives based on the moles of alumina present in the reaction mixture:

| | |
|---|---|
| $K_2O/Al_2O_3$ | 0.1–0.4 |
| $H_2O/Al_2O_3$ | 100–0 | heating the mixture at a temperature of from 90 to 120° C. until the crystalline zeolite is formed, and separating the resulting crystalline zeolite from the mother liquor.

The term "zeolite," in general, refers to a group of hydrated metal aluminosilicates, many of which are crystalline in structure. The material of this invention corresponds to a crystal structure previously disclosed and denoted by the terms faujasite and "Type X," "Type Y" and "Z-14HS" zeolites. However, processes for making sodium-potassium forms of this structure and the crystalline product have not been previously known.

Micro-selective adsorbents of the zeolite group are crystalline metal aluminosilicates with a three-dimensional structure of silica-alumina tetrahedra. These zeolite structures are characterized by repeating three-dimensional networks of large open aluminosilicate cages interconnected with small uniform openings or pores. Certain of these micro-selective adsorbents have been prepared from sodium silicate and sodium aluminate. After synthesis, these large cavities are filled with water which can be driven off by heating without collapsing the cage. When dehydrated, these cavities can re-adsorb large quantities of water and other vapors at low partial pressures.

Due to the uniform strictures or pores openings connecting the aluminosilicate cavities, these silicates exhibit the unique property of excluding larger molecules from the cavity and allowing smaller molecules to pass through and be adsorbed, thereby acting as micro-selective adsorbents for molecules according to their size and shape. The adsorbents of this invention have an effective pore size of about 10 Angstrom units and are also of interest for use in adsorbing molecules and storing them for later release. These micro-selective adsorbents will adsorb molecules whose critical size is below about 10 Angstrom units. These materials can function as carriers for a wide variety of chemical compounds. When the chemical compound is needed, it is released by heating the carrier or by displacement of the chemical compound with another adsorbent such as water. In addition, these zeolites also exhibit the property of base exchange, whereby one metal cation can be exchanged for another, thereby allowing controlled changes in effective pore size.

It is one object of this invention to provide a new synthetic crystalline zeolite.

It is another object of this invention to provide processes for forming the new crystalline zeolite.

A number of synthetic crystalline zeolites have been previously prepared. These are distinguishable from each other, and from the naturally occurring materials, on the bases of their compositions, crystal structures and adsorption properties. A suitable method for identifying the crystal structures of these compounds is by their X-ray powder diffraction patterns, for example. The existence of a number of zeolites having similar but distinguishable properties advantageously permits the selection of a particular member having optimum properties for a particular use. The composition of the crystalline zeolite of this invention can be expressed in terms of mole ratios of oxides. Thus, the formula for the zeolite of this invention can be represented as follows:

$$(XK_2O:YNa_2O):Al_2O_3:3-6SiO_2:0-9H_2O$$

wherein X is within the range of from 0.1 to 0.4 and Y is within the range of from 0.9 to 0.6, the atoms of said zeolite being arranged in a unit cell in such a manner that X-ray powder diffraction pattern of the material is essentially the same as that shown in Table A. Minor variations in the mole ratios of these oxides, within the ranges indicated by the above formula, do not significantly change the crystal structure or physical properties of the zeolite. The value of the water content depends largely upon the degree of hydration of the zeolite.

The crystalline zeolite of this invention can be prepared from a silica-alumina-sodium oxide-potassium oxide-water mixture. This reaction mixture can be prepared in several ways. For example, the silica component can be added to an aqueous sodium and potassium aluminate solution containing excess caustic. The aluminates employed in the process of this invention can be any commercial aluminate such as sodium aluminate or potassium aluminate, or they can be conveniently prepared by dissolving alumina trihydrate in an alkali metal hydroxide solution. If desired, one alkali metal may be added as the aluminate and the other may be added as the hydroxide. Alternatively, the aluminate hydroxide solution can be added to a silica-water slurry.

The silica employed in the process of this invention is a commercially available fine-sized silica having a particle size in the range of about 0.2 to 4 microns. The silica is commercially available under the trade names Hi Sil, Cabosil, Syloid, etc. The silica is preferably calcined at a temperature of from 200 to 1200° C. for a period of from 0.1 to 72 hours, preferably from 0.1 to 16 hours. Although fine-sized silica is the preferred silica source, the commercially available silica sols can be used in preparing these compounds with some process modifications.

The alumina source may be in the form of activated alumina, alpha-alumina, gamma-alumina, alumina trihydrate, or the alkali metal aluminates as described above.

The alkali metal source can be the aluminate and/or the alkali metal hydroxide. Commercially available potassium and sodium hydroxides are contemplated.

The silica-alumina-sodium oxide-potassium oxide-water mixture formed is aged by maintaining it at a temperature of from about 20 to 60° C. for at least 2 hours. The crystalline zeolite is formed in the aged mixture by heating the mixture at a temperature of from 90 to 120° C. until the crystalline zeolite product is formed. At 100° C., the crystallization period is usually from about 12 to 72 hours. The crystalline zeolite product can be separated from the mother liquor by any convenient technique such as filtration.

In the above described process, the mole ratios of oxides in the reaction mixture can be as follows:

| | Operable Range | Preferred Range |
|---|---|---|
| $K_2O/Al_2O_3$ | 0.1–0.4 | 0.15–0.35 |
| $Na_2O/Al_2O_3$ | 2–4 | 2.5–3.5 |
| $SiO_2/Al_2O_3$ | 7–14 | 8–12 |
| $H_2O/Al_2O_3$ | 100–200 | 110–160 |

The composition of this invention can also be formed by an alternative method. In the alternative method, a silica-alumina-sodium oxide-water reaction mixture is prepared from the materials described above. The mole ratios of oxides in the reaction mixture can be as follows:

| | Operable Range | Preferred Range |
|---|---|---|
| $Na_2O/Al_2O_3$ | 2–4 | 2.5–3.5 |
| $SiO_2/Al_2O_3$ | 7–14 | 8–12 |
| $H_2O/Al_2O_3$ | 100–200 | 100–160 |

The reaction mixture is then aged at a temperature of from about 20 to 60° C. for at least 2 hours. Then potassium hydroxide and, if desired water, preferably in the form of an aqueous potassium hydroxide solution, is added to the aged mixture to form a crystallization mixture. The ingredients are thoroughly mixed. The quantities of potassium hydroxide and water added are sufficient to provide the following mole ratios of additives based on the moles of alumina present in the reaction mixture:

| | Operable Range | Preferred Range |
|---|---|---|
| $K_2O/Al_2O_3$ | 0.1–0.4 | 0.15–0.35 |
| $H_2O/Al_2O_3$ | 100–0 | 60–0 |

The crystalline zeolite is formed from the crystallization mixture by heating the mixture at a temperature within the range of from about 90 to 120° C. until the crystalline zeolite is formed. At the temperature of 100° C., the zeolite is usually formed within a period of 12 to 72 hours. The zeolite is then separated from the mother liquor by any conventional technique such as filtration, for example.

The crystal structure of the zeolite of this invention can be identified by the $d(A.)$ values, i.e., interplanar spacing in Angstrom units, the values of which are given in Table A.

Occasionally, additional lines not belonging to the pattern of the zeolite of this invention appear in the pattern along with the X-ray lines characteristic of the zeolite. This is an indication that one or more additional crystalline materials are mixed with the zeolite in the sample being tested. The particular X-ray technique and/or apparatus employed, the humidity, the temperature, the orientation of the powdered crystals, and other variables all of which are well understood by those skilled in the art of X-ray crystallography or diffraction may also cause some variations in the intensities and positions of the X-ray lines. Thus, the X-ray data given herein to identify the zeolite of this invention is not to exclude those materials which, due to some variable mentioned above or otherwise known to those skilled in the art, fail to show all of the tabulated X-ray lines, or show a few extra ones that are not permissible to the crystal system of the zeolite, or show a slight change in the intensity position of some of the X-ray lines.

The zeolite of this invention is distinguished from other zeolites having the same crystal structure by the chemical composition. The zeolite of this invention has the following general composition expressed in terms of mole ratios of oxides:

$$(XK_2O:YNa_2O):Al_2O_3:3-6SiO_2:0-9H_2O$$

wherein X is within the range of from 0.1 to 0.4 and Y is within the range of from 0.9 to 0.6.

The scope and utility of our invention is further illustrated by the following specific, but non-limiting, examples.

*Example I*

This example shows the formation of the zeolite of this invention from a silica-alumina-sodium oxide-potassium oxide-water reaction mixture.

A NaOH and KOH solution was prepared by dissolving 85.2 g. of NaOH pellets (66 g. of $Na_2O$) and 8.68 g. KOH pellets (6.3 g. of $K_2O$) in 96.5 ml. of water which was heated to 100° C. To this caustic solution 52.0 g. of commercial alumina trihydrate (34 g. $Al_2O_3$) was slowly added. The solution was then cooled to room temperature and diluted with 195 ml. of $H_2O$.

The reaction mixture was then formed by adding 199 g. of an aqueous slurry of a commercial fine-sized silica (191.0 g. of $SiO_2$) in 476.9 g. of water to the solution. The silica had been calcined at 400° F. for 16 hours.

The reaction mixture was then aged at ambient temperatures (approximately 25° C.) for 3 days. The zeolite was formed from the aged mixture by heating to a temperature of 100° C., and samples were removed after 16, 24 and 48 hours. Each sample was filtered, washed well with water, and dried at 110° C. Surface area measurements were made on each sample by the well known Brunauer, Emmett, Teller method described in the article by S. Brunauer, P. Emmett, and E. Teller, J. Am. Chem. Soc. 16, 309 (1938). X-ray diffraction measurements were made on each sample using Norelco diffraction equipment with Ni filtered CuK alpha radiation, 40 kv. 20 ma.

The X-ray diffraction pattern of the material is shown in Table A.

TABLE A

| d(A): | I/I |
|---|---|
| 14.6 | 100 |
| 8.9 | 34 |
| 7.56 | 22 |
| 5.75 | 40 |
| 4.81 | 12 |
| 4.41 | 20 |
| 3.95 | 10 |
| 3.81 | 48 |
| 3.34 | 46 |
| 3.05 | 11 |
| 2.947 | 19 |
| 2.882 | 44 |
| 2.794 | 18 |
| 2.661 | 18 |

The surface areas found are shown in Table B.

TABLE B

| Reaction time, hrs.: | Surface areas m.²/g. |
|---|---|
| 16 | 728 |
| 24 | 805 |
| 48 | 620 |

A chemical analysis of the dehydrated 48 hour sample was made, and the mole ratios of oxides found were as follows:

$(0.70Na_2O:0.26K_2O):Al_2O_3:5.4SiO_2$

*Example II*

This example shows the alternate method for producing the zeolite of this invention.

A NaOH solution was prepared by dissolving 85.2 g. of NaOH pellets (66 g. of NaOH) in 96.5 ml. of water heated to 100° C. To this caustic solution was added 52.0 g. of commercial alumina trihydrate (34 g. $Al_2O_3$). The solution was cooled to room temperature and diluted with 195 ml. of $H_2O$. Then an aqueous slurry of 431.3 g. of water and 199 g. of commercial fine-sized silica which had been calcined at 400° F. for 16 hours was added to the solution, and the ingredietns were thoroughly mixed.

The reaction mixture was then aged for 3 days at ambient temperatures.

The crystallization mixture was formed by adding 8.68 g. of KOH (6.3 g. of $K_2O$) dissolved in 48 g. of $H_2O$ to the aged reaction mixture.

The zeolite was formed in the crystallization mixture by heating at 100° C. Samples were removed after 16, 24 and 48 hours, were washed well, and dried at 110° C. The product was found to exhibit the X-ray diffraction pattern shown in Table A. The surface areas of the samples were measured and are shown in Table C.

TABLE C

| Reaction time, hrs.: | Surface area, m.²/g. |
|---|---|
| 16 | 475 |
| 24 | 913 |
| 48 | 782 |

The oxide mole ratios of the dehydrated product were as follows:

$(0.83Na_2O:0.15K_2O):Al_2O_3:5.4SiO_2$

Obviously, many modifications and variations of the invention as herein set forth may be made without departing from the essence thereof, and only such limitations should be applied as are indicated in the appended claims.

We claim:
1. A process for preparing a synthetic crystalline zeolite having a composition expressed in terms of mole ratios of oxides as follows:

$(XK_2O:YNa_2O):Al_2O_3:3-6SiO_2:0-9H_2O$ wherein X is within the range of from 0.1 to 0.4 and Y is within the range from 0.9 to 0.6, the atoms of said zeolite being arranged in a unit cell in such a manner that the X-ray powder diffraction pattern of the material is essentially the same as that shown in Table A, which process comprises the following steps:

(a) preparing a silica-alumina-sodium oxide-water reaction mixture having a composition, expressed in terms of mole ratios of oxides which falls within the following ranges:

| $Na_2O/Al_2O_3$ | 2-4 |
|---|---|
| $SiO_2/Al_2O_3$ | 7-14 |
| $H_2O/Al_2O_3$ | 100-200 | wherein the silica reactant is a fine-sized silica.

(b) aging the mixture at a temperature of from about 20 to 60° C. for at least 2 hours.

(c) adding to the aged mixture quantities of potassium hydroxide and water sufficient to provide the following mole ratios of additives per mole of alumina in the reaction mixture:

| $K_2O/Al_2O_3$ | 0.1-0.4 |
|---|---|
| $H_2O/Al_2O_3$ | 100-0 |

(d) heating the mixture at a temperature of from 90 to 120° C. until the crystalline zeolite is formed, and (e) separating the resulting crystalline zeolite from the mother liquor.

2. The process according to claim 1 wherein the reaction mixture composition is as follows:

| $Na_2O/Al_2O_3$ | 2.5-3.5 |
|---|---|
| $SiO_2/Al_2O_3$ | 8-12 |
| $H_2O/Al_2O_3$ | 100-160 | and the quantities of potassium hydroxide and water added to the reaction mixture are sufficient to provide the following mole ratios of additives per mole of alumina in the reaction mixture:

| $K_2O/Al_2O_3$ | 0.1-0.4 |
|---|---|
| $H_2O/Al_2O_3$ | 100-0 |

3. The process according to claim 1 wherein the silica reactant has been calcined at a temperature of from 200 to 1200° C.

References Cited

UNITED STATES PATENTS

| 2,882,244 | 4/1959 | Milton | 23—112 X |
| 3,012,853 | 12/1961 | Milton | 23—113 |
| 3,130,007 | 4/1964 | Breck | 23—113 |
| 3,216,789 | 11/1965 | Breck et al. | 23—113 |
| 3,264,059 | 8/1966 | McDaniel et al. | 23—113 |

EDWARD J. MEROS, *Primary Examiner.*